United States Patent [19]

Sanno et al.

[11] Patent Number: 4,742,967
[45] Date of Patent: May 10, 1988

[54] SYSTEM FOR DELIVERING PACKAGES TO AN AUTOMATIC WINDER

[75] Inventors: Hiroaki Sanno, Nonoichi; Takaharu Matsuoka; Kenji Katada, both of Kanazawa, all of Japan

[73] Assignee: Murao Boki Kabushiki Kaisha, Kanazawa, Japan

[21] Appl. No.: 5,895

[22] Filed: Jan. 12, 1987

Related U.S. Application Data

[63] Continuation-in-part of Ser. No. 825,485, Feb. 3, 1986, abandoned.

[30] Foreign Application Priority Data

Feb. 15, 1985 [JP] Japan .................................. 60-28803
Apr. 15, 1985 [JP] Japan .................................. 60-79908

[51] Int. Cl.$^4$ ...................... B65H 54/26; B65H 67/06
[52] U.S. Cl. ............................... 242/35.5 A; 242/18 R
[58] Field of Search ............... 242/35.5 A, 35.5 R, 242/35.6 R, 35.6 E, 18 R, 18 EW

[56] References Cited

U.S. PATENT DOCUMENTS

| | | |
|---|---|---|
| 3,358,940 | 12/1967 | Beckwith, Jr. et al. ........ 242/35.5 R |
| 3,368,766 | 2/1968 | Livingston ..................... 242/35.5 R |
| 3,474,975 | 10/1969 | Brouwer et al. ............... 242/35.5 R |
| 3,506,209 | 4/1970 | Matsui et al. .................. 242/35.5 R |
| 3,774,859 | 11/1973 | Brouwer et al. ............... 242/35.5 R |
| 3,998,397 | 12/1976 | Haberkorn et al. ............ 242/35.5 A |
| 4,010,907 | 3/1977 | Nishiyama et al. ............ 242/35.5 A |
| 4,212,433 | 7/1980 | Matsui et al. ................. 242/35.5 A |
| 4,571,931 | 2/1986 | Kupper ....................... 242/35.5 A X |
| 4,576,340 | 3/1986 | Aretz et al. .................. 242/35.5 A |
| 4,595,152 | 6/1986 | Matsui et al. ................. 242/35.5 A |

Primary Examiner—Stanley N. Gilreath
Attorney, Agent, or Firm—Oblon, Fisher, Spivak, McClelland & Maier

[57] ABSTRACT

A system for delivering packages wound by ring spinning frames to an automatic winder including cop magazines, wherein the leading yarn end of each package is caught and previously put into the top opening of the bobbin. The system includes a disposal machine for disposition of leading yarn end; a circulating conveyor line laid along the row of cop magazines, and provided with circulating trays for transporting packages from the disposal machine; and a transfer machine arranged so as to move along the row of cop magazines freely in opposite directions of travel on the conveyor line for transferring each package from one tray to any cop magazine as desired.

4 Claims, 13 Drawing Sheets

SYSTEM FOR DELIVERING PACKAGES TO AN AUTOMATIC WINDER

CROSS-REFERENCE TO RELATED APPLICATION

This application is a continuation-in-part of U.S. Application Ser. No. 825,485 filed Feb. 3, 1986, now abandoned.

BACKGROUND OF THE INVENTION

1. Field of the Invention

The present invention relates to a system for delivering packages wound by ring spinning frames to an automatic winder including cop magazines, the system being arranged so as to put the leading yarn end of each package in the top mouth of the bobbin prior to the delivery of packages. The packages are delivered along a conveyor line having rotary trays, during which they are picked up by a disposal machine so as to transfer them to the automatic winder. Hereinafter, the system of the invention will be referred to merely as the delivery system or the system.

2. Description of the Prior Art

Many automatic delivery systems are known in the art. For example, there is a system which is provided with a container in which packages stand in an orderly manner, traveling and returning over a row of cop magazines, or a reserving cylinder in which a plurality of packages are stacked, for feeding packages to any required magazine. In a system of another type, packages are transported by a flat conveyor and fed from the conveyor to any required cop magazine through a gate door. The first-mentioned type requires a package container of large size, disposed over cop magazines, and a special conveyor for transporting the container. This makes it difficult to inspect and operate the winder sufficiently. In the second type the packages are laid on the conveyor belt for transportation, so that the surfaces of packages are liable to be dirty or that the packaged yarn is likely to become entangled.

In general when the packages are delivered to an automatic winder, the leading yarn end of a package is usually led and held in the top opening of the bobbin prior to the delivery operation, so as to facilitate the ending operation under suction. However, it sometimes happens that yarn comes out of the top opening unless the packages are carefully handled. It is not favorable to vibrate a container which has a large number of packages therein, nor to let them fall a long distance. In transporting the packages by a conveyor belt, they are likely to roll about, so that the yarn ends held in the top openings of the bobbins readily slip therefrom under shock forces occuring when the bobbins collide with the walls of the conveyor.

SUMMARY OF THE INVENTION

The system for delivery packages to an automatic winder includes a disposal machine for disposing their leading yarn ends in the top openings of each bobbin; trays for allowing each package to stand thereon with appropriate spaces therebetween, the trays being placed in a closed loop on a circulatory conveyor line; and a transfer machine disposed on the conveyor line, the machine being movable along the row of cop magazines of an automatic winder, thereby delivering packages with each leading yarn end thereof secured in the top openings of the bobbins.

BRIEF DESCRIPTION OF THE DRAWINGS

The invention will be understood more clearly and precisely when taken in conjunction with the following detailed description and drawings, wherein.

DETAILED DESCRIPTION OF INVENTION

Figure 1:
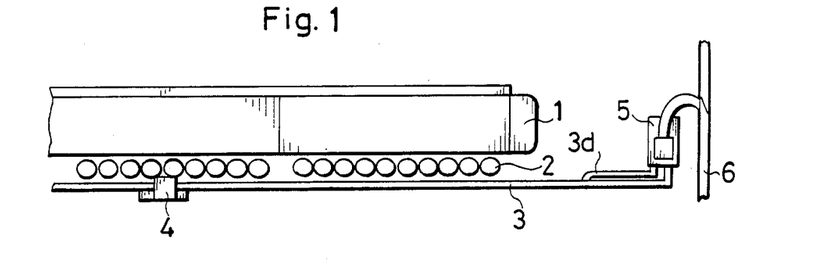
FIG. 1 is a plan view showing the system of the present invention.
Figure 2:
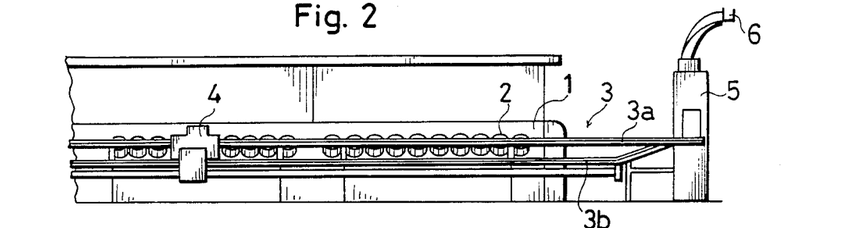
FIG. 2 is a fragmentary side view of the lower part of FIG. 1.
Figure 3:
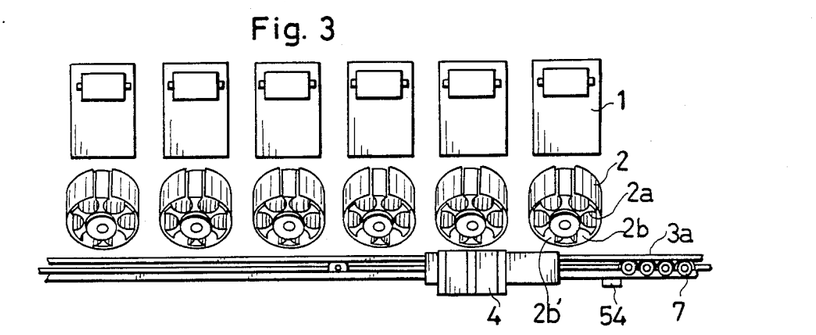
FIG. 3 is an enlarged fragmentary view of the system.
Figure 4:
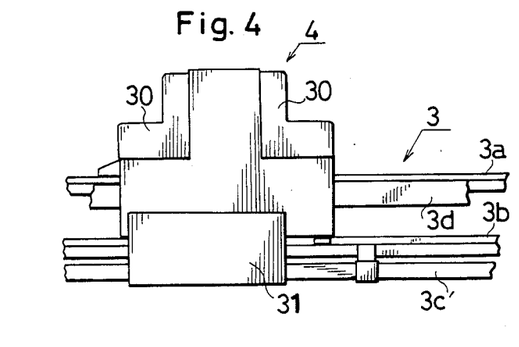
FIG. 4 is a fragmentary side view showing a lower part of the system.
Figure 5:
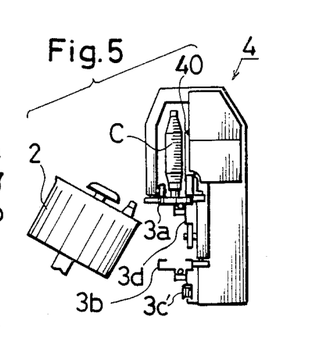
FIG. 5 is a left side view.

As seen in FIGS. 1 to 3, there are provided an automatic winder 1 having a number of winder units, and cop magazines 2 disposed in front of each winder unit. This type of automatic winder is known in the art, commonly called as "auto coner" made by W. Schlafhorst and Co. Each cop magazine includes a magazine creel having a plurality of grooves for holding packages around it, and is turned by one pitch to bring a new package in the winding unit when a package thereon is to be rewound. The delivery system according to the present invention is a system for delivering one or two new packages to vacant grooves in the magazine creel at the same time or consecutively while the grooves remain vacant at their appointed positions.

Figures 6, 7, 8, 9:
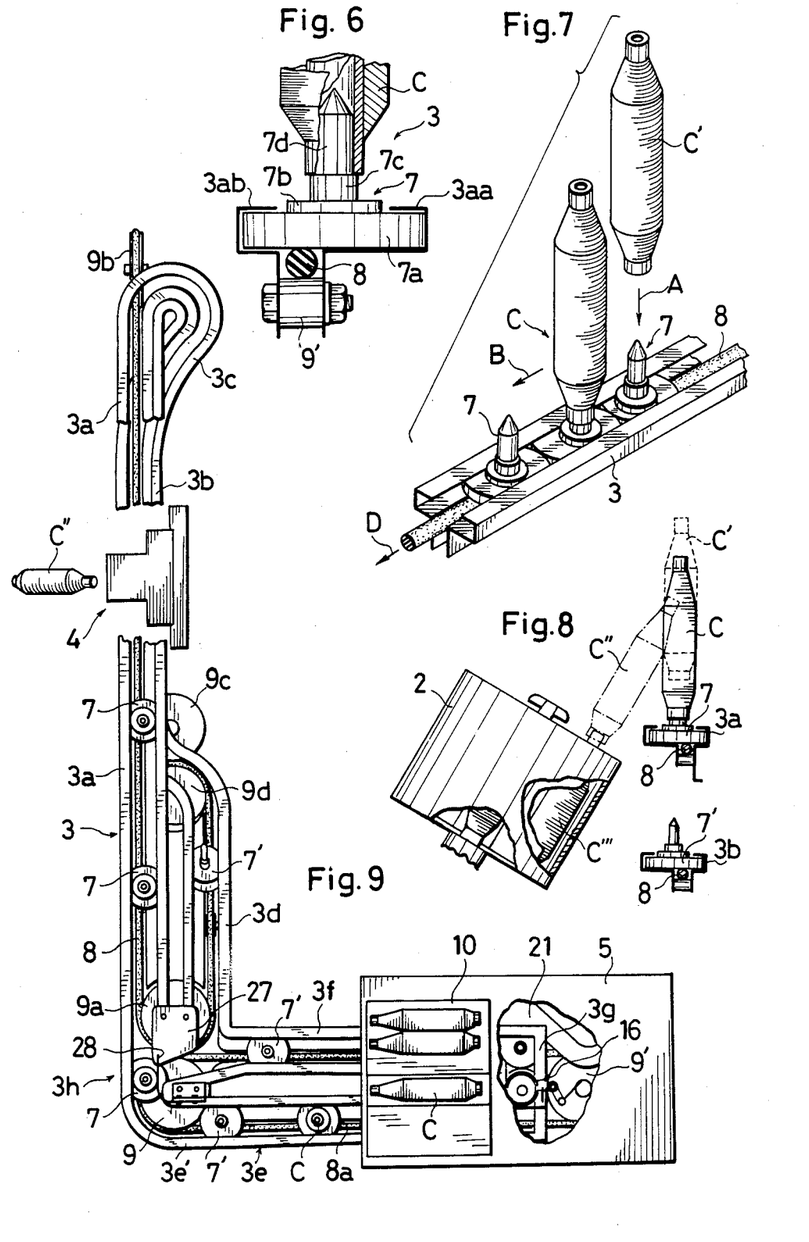
FIG. 6 is a fragmentary vertical section of rails for transporting packages.
FIG. 7 is a fragmentary perspective view of the rails.
FIG. 8 is a view showing the transfer of a package to a cop magazine.
FIG. 9 is a plan view showing the outline of the conveyor line.

The conveyor line 3 of the delivery system of the present invention is disposed in front of, and parallel with, the row of the cop magazines 2, and the conveyor line 3 in front of the cop magazines 2 includes an upper line 3a for supplying new packages, and a lower line 3b for returning vacant trays. The conveyor line 3 is associated with a disposal machine 5 for processing leading yarn ends at the feed side (right-hand in the drawings). The upper lines 3a is connected to the lower line 3b by a descending line 3c at its left end (FIG. 9), and in the feed side, is bent toward the disposal machine 5 virtually at a right angle at the joint 3e, and the lower line 3b is connected to the disposal machine 5 by an ascending line 3d bent toward the disposal machine 5 virtually at right angle, so as to connect these lines to the disposal machine 5 in parallel with each other at the same height. The conveyor line 3 has, as seen in FIG. 6, trays 7 for supporting packages in an erect posture individually. Each tray 7 is formed in one piece of plastic having a base plate 7a, a guide column 7b formed on the base plate 7a at the center, a shoulder 7c having a little smaller diameter than the bottom outside diameter of the bobbin through which the yarn is entered, and supporting pin 7d projected upward from the center of the shoulder 7c. The conveyor line 3 also has a pair of guide rails 3aa, 3ab, both having U-shaped channels facing each other, and a driving belt 8 having a circular cross-section biased toward one side. The driving belt 8 is supported by pulleys 9' each of which is supported by a shaft associated with these rails in such a manner as to maintain its circumference higher than the common bottom plane of U-shaped channels of these rails 3aa, 3ab. In this way the base plate of each tray 7 is supported by the belt 8 and one of the two rail 3aa and the trays 7 are driven by the belt 8. As seen in FIG. 7, if the driving belt 8 is driven in the direction of the arrow D, the trays 7 are moved to the direction of the arrow D unless any stopping means works. The tray 7 can be stopped at a desired position by operating a retaining means (for example, a projecting rod controlled by an electromagnetic device), so as to load a package C' on the tray 7; then, it will be released for transporting the loaded package C along the conveyor line 3 in the direction of the arrow B. The preceeding tray 7 is a misloaded vacant one. A transfer machine 4 is moved to the front of the cop magazine 2 which requires a supplemental package, and functions to raise the package C up to the position C' for pulling the package C alone out of the tray 7 so as to incline it as shown by C" for loading it to the cop magazine 2, in which it is loaded in a holding groove of the magazine creel as shown by C'''.

The guide rails of the conveyor line 3 are made up of several parts, each having an appropriate length and being connected to the other along the length, and the driving belt 8 is flexible, having a round cross-section, whereby the rails can be bent in any direction not only horizontally but also vertically. In the conveyor line 3 shown in FIG. 9 the driving belt 8 is divided into two parts from its functional point of view; one is the part thereof which passes on a horizontal driving pulley 9a, a vertical guide pulley 9b, a horizontal guide pulley 9c and an inclined guide pulley 9d. In this way the belt 8 provides the ascending line 3d between the pulleys 9a and 9d. The other part of belt 8 is caused to run on the pulleys 9 and 9' located between the process machine, so as to provide the line 3e.

The thicknesses of these pulleys are smaller than the diameter of the driving belt 8, so that the bottom of the tray base plate 7a can maintain contact with the side plane of these pulleys, except the vertical guide pulley 9b, whereby the base plates 7a are moved by the driving belt 8. The driving belt 8 is drawn out of the rails at the connecting part of the upper line 3a with the winding decline 3c, so that the vacant trays released from the driving belt 8 slide down to the lower line 3b, and these trays are driven along the lower line 3b and the ascending line 3d by the driving belt 9 passing therethrough, whereby the trays are transferred to another part of the driving belt 8a passing through the rails 3f so as to return vacant trays.

Packages wound by the ring spinning frame are carried by a conveyor 6 shown in FIGS. 1 and 2, and the packages slide down and are deposited on the trays one by one, holding their leading yarn ends in the respective top openings of the bobbins. However, a vacant tray 7' is sometimes sent to the rails 3e' when any problem occurs such as a shortage of packages in the hopper, a missing yarn end, or the misplacement of a package on the tray. The vacant trays 7' are difficult to remove from the conveyor line 3 unless a special mechanism is used, which thus makes it difficult to properly operate the transfer machine 4.

Therefore the delivery system according to the present invention further includes a concentrating machine arranged to classify vacant trays and loaded trays, and to send back vacant trays to the rails 3f. The concentrating machine is located at the turning part 3h of the conveyor line 3, which part includes a transfer path for transferring trays between the driving belt 8a extend into the disposal machine 5 and the driving belt 8 for transporting loaded trays and returning vacant trays. The concentrating machine includes a guide plate 27 located above the driving pulley 9a and a package guide 28 located above the driving pulley 9. The package guide 28 is supported by a bracket 28a at a higher position than the guide plate 27 so as to allow vacant trays 7' to pass but to prevent loaded ones 7 from passing. In this way all the vacant trays 7' are returned to the disposal machine 5 by the guide plate 27 and the driving belt 8a, but the loaded trays are prevented from moving to the rails 3f by the package guide 28 kept in contact with the package C, and forced to move toward the driving belt 8 on the feed side along the side edge 27a of the guide plate 27.

Figure 10:
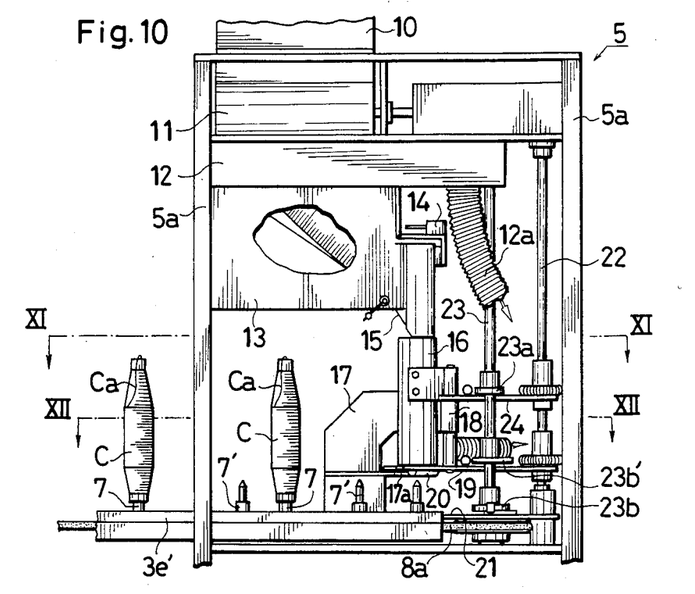
FIG. 10 is a side view of a disposal machine.
Figure 11:
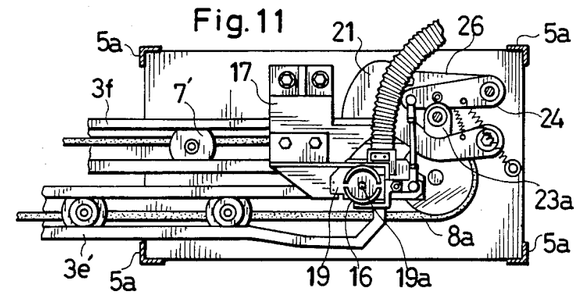
FIGS. 11 and 12 are sections taken along lines XI—XI and XII—XII in FIG. 10, respectively.
Figure 12:
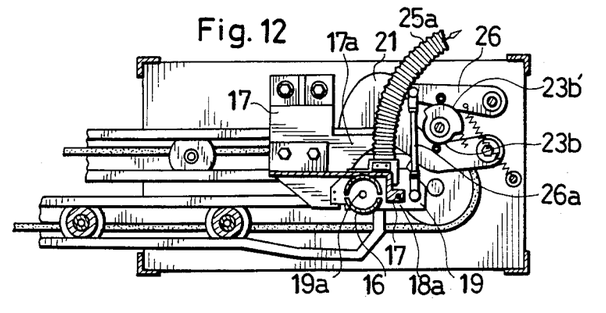
Figure 13:
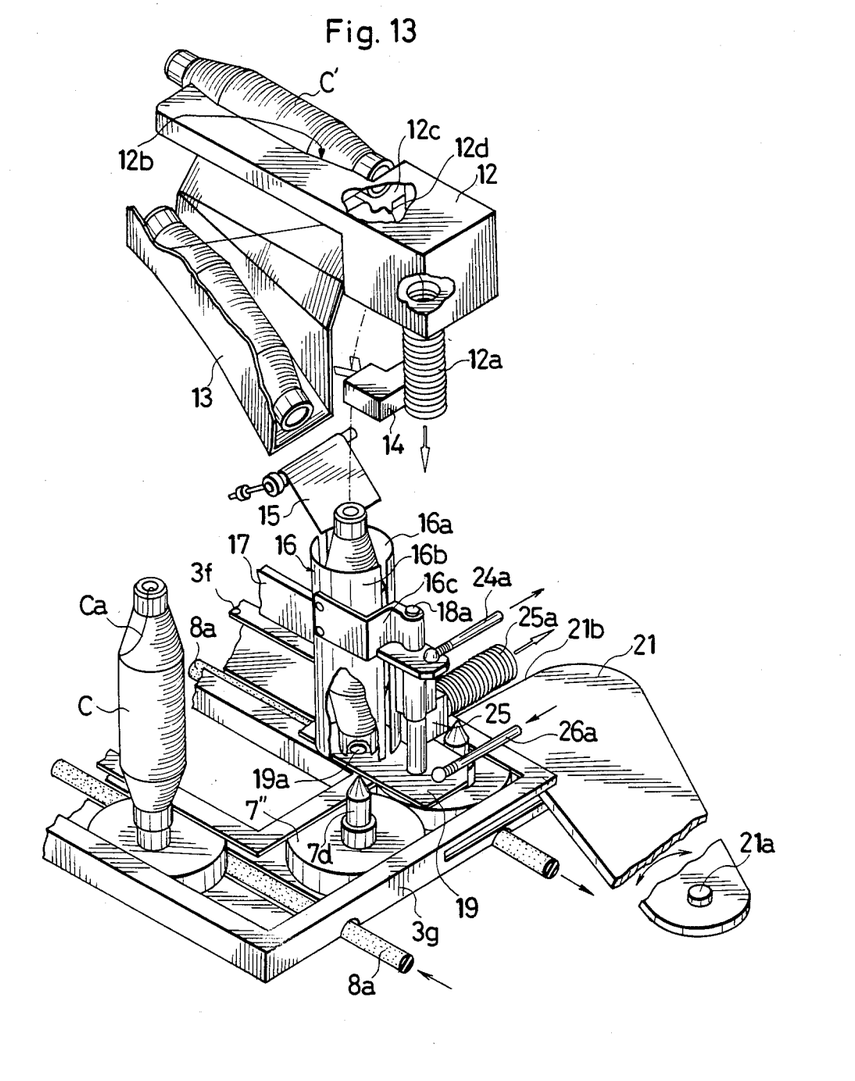
FIG. 13 is a perspective view of the disposal machine.

The disposal machine 5, as illustrated in FIGS. 10, 12, and 13, has frames 5a and a hopper 10. The hopper 10 is provided with a chute 13 for dropping the packages one by one, and the chute 13 is provided with a package turning gear 11 which holds both ends of each package to revolve it in a rewinding direction. A suction nozzle 12 is disposed near the package being held and rotated by the package turning gear 11, which nozzle has a flat slit 12b opened along the periphery of the package C', and wherein a vacuum is generated at the beginning part of the slit. The suction is communicated with a suction pipe 12a having an opening 12c which is open against the bottom of the package, and which is communicated with a yarn end guide groove 12d.

The leading end of yarn sucked into the vacancy through the slit 12b and the opening 12c during the turning of the package is led and held in groove 12d formed at an edge of the opening 12c. Then, the package is released from the turning gear 11 and dropped into a guide cylinder 16 in its vertical posture along the chute 11. A swing plate 15 is disposed under the chute 13 for sensing the package fall so as to stop the yarn from being drawn excessively under suction.

Figures 14, 15, 16:
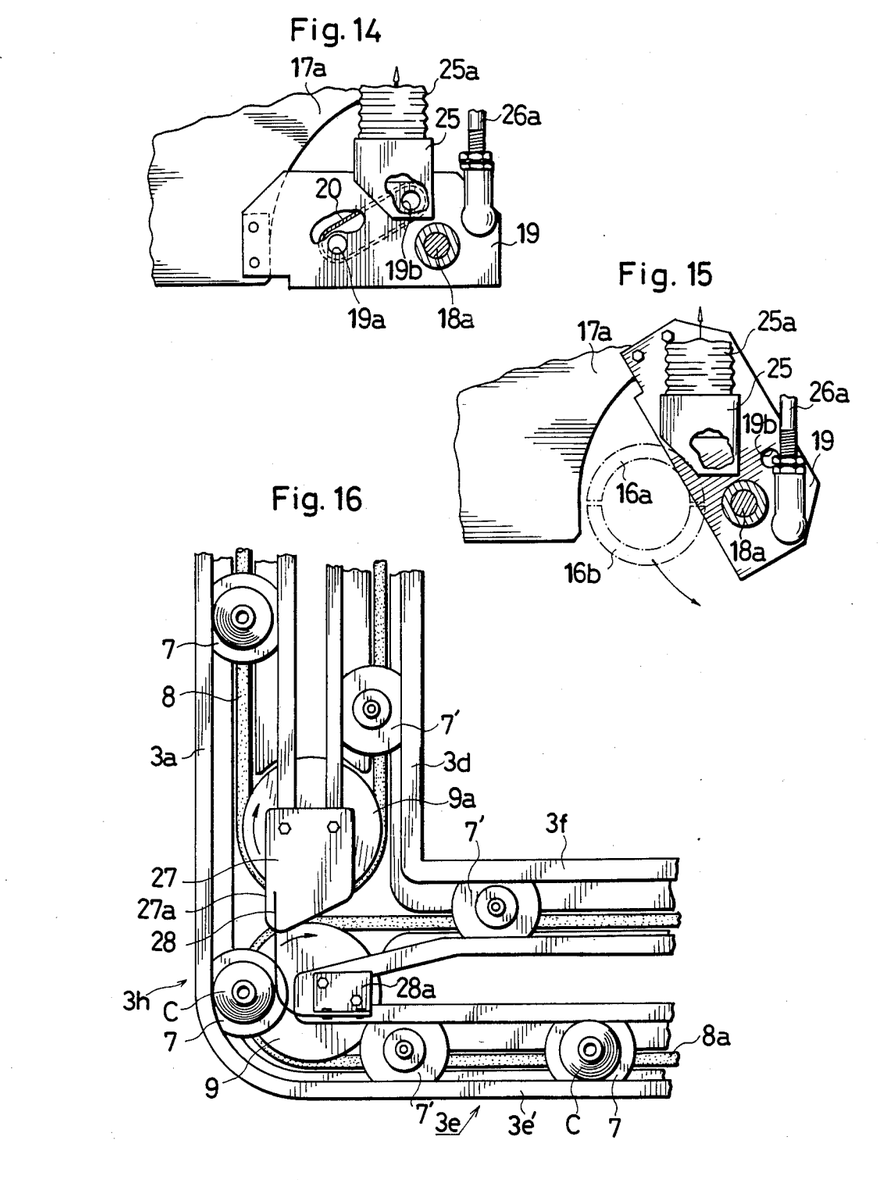
FIG. 14 is an enlarged fragmentary view.
FIG. 15 is a view showing the part of FIG. 14 in operation.
FIG. 16 is a fragmentary plan view of the conveyor line.
Figure 17:
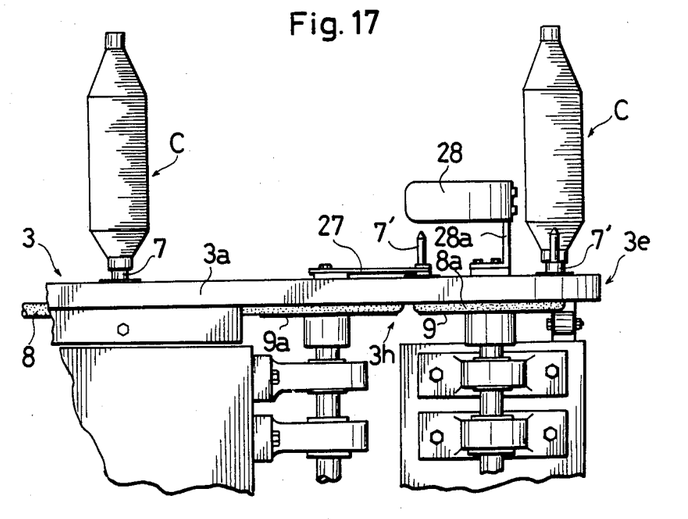
FIG. 17 is a left-hand side view of FIG. 16.

The guide cylinder 16 consists of two parts, each having a semi-circular cross-section. One is a fixed wall 16a and the other is a movable wall 16b. The fixed wall 16a is fixed to a bracket 17 provided on the frame, and the movable wall 16b having a supporting member 16c which is connected rotatably to a shaft 18a on a shaft holding part 18 of the bracket 17. The supporting member 16c is connected to an actuating rod 24a so as to rotate in a counter-clockwise direction, and to open the guide cylinder 16, when the actuating rod 24a is actuated in the direction of the arrow in FIG. 13. Moreover, a rotary plate 19 is located under the guide cylinder 16, covering the bottom side thereof, and supported rotatably by the shaft 18a via a vertical boss thereof. Another actuating rod 26a is provided, which, when actuated in the opposite direction to that of the arrow, moves the rotary plate 19 to a closing position, where the plate 19 covers the bottom of the guide cylinder 16, and the packages dropped into the guide cylinder 16 are held. The rotary plate includes a suction duct 20 located at its lower part, and a suction port 19a which is opposed to the center of the guide cylinder 16, and communicated with the suction duct 20. The suction duct 20 is communicated with an air hole 19b, which is located adjacent a zone opposite the guide cylinder 16, and which is opposed to a low-pressure chamber 25 fixed to the bracket 17 above the rotary plate, when the rotary plate 19 is in the closing position. FIG. 14 shows the state of the guide cylinder 16 closed by the rotary plate 19, where the sucking force of the suction hose 25a is exerted at the port 19a through the air hole 19b. When the actuating rod 26a is actuated in the direction of the arrow (FIG. 13), the rotary plate 19 is rotated as shown in FIG. 15, and the package is shifted through the opened bottom of the guide cylinder 16. Then the air hole 19b shifts away from the opening of the chamber 25 thereby to discontinue the suction. The rotation of the rotary plate 19 is facilitated by a slide seat 17a.

The yarn of the package transferred to the guide cylinder 16 by the chute 13 is held in the cut portion 12d of the suction nozzle 12, and cut by a cutter 14, which is disposed on the top of the guide cylinder 16, as shown in FIG. 13. The bobbin of the package thrown in the guide cylinder 16 is supported by the rotary plate 19, and is located so as to cover the suction port 19a, so that the sucking force exerted therein is transmitted to the top opening of the bobbin, thereby to suck the leading end Ca of a cut yarn into the bobbin hole, thus obtaining the package C having the processed leading yarn end Ca as seen in FIG. 13.

The tray conveyor line 3e passing through the disposal machine 5 includes a pair of bypass rails 3g having a pair of rails 3f in the tray feed side and a pair of rails 3e' in the package feed side, thereby allowing the trays 7 to pass. As seen in FIG. 13, a swing arm 21, which oscillates about an axle 21a, as shown by the crossed arrows, to feed vacant trays one by one to the bypass rails 3g at each swinging action. The free end edge 21b of the swing arm 21 serves to control the subsequent vacant trays. The vacant tray on the bypass rails 3a is positioned so as to align with the center of the guide cylinder 16, and the package transferred from the guide cylinder 16 by the withdrawing rotary plate 19 is held by a pin 7d. The movable wall 16a of the guide cylinder 16 is opened. In this opened posture the subsequent vacant tray is fed, and the loaded tray is pushed out of the bypass rails 3g, and driven by the driving belt 8a again. It is recommended that the bypass rails 3g be provided with a retaining means, such as a leaf spring, so as to secure the tray at a desired position. The loaded tray is transported to the upper line 3a for supplying fresh packages through the concentrating machine, and the packages are transferred from the trays to a desired cop magazine 2 by the transfer machine 4 placed movably along the upper line 3a.

Figure 18:
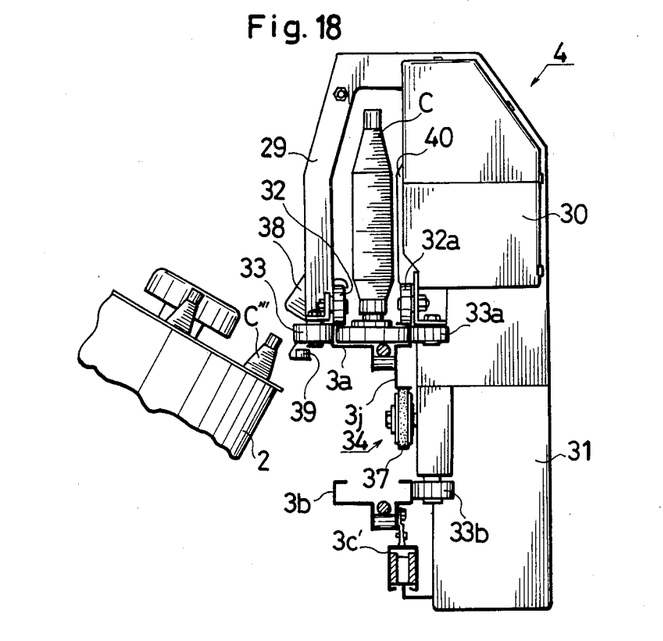
FIG. 18 is a side view of a transfer machine.
Figure 19:
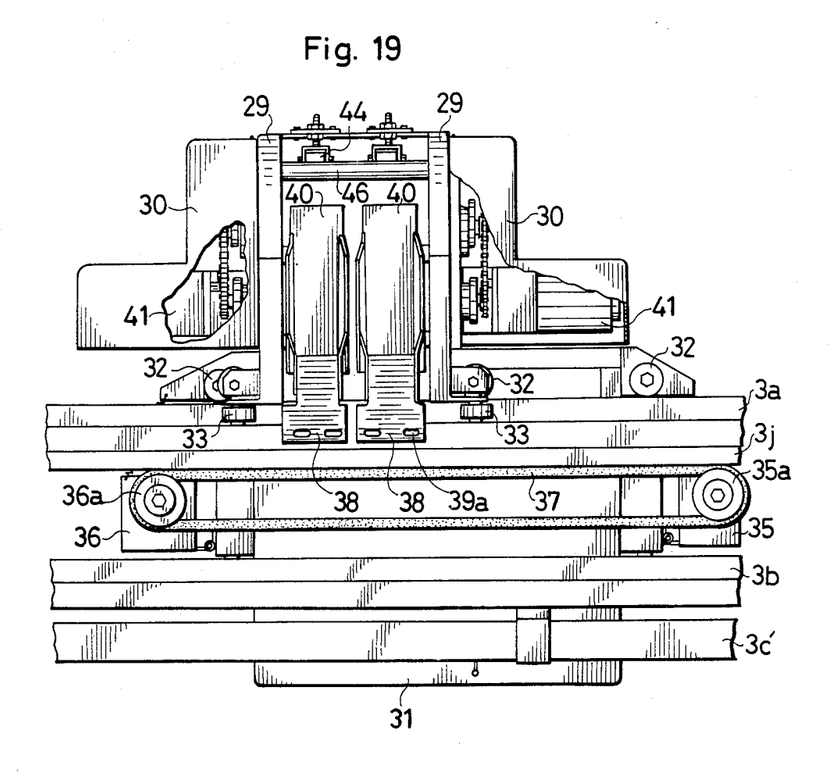
FIG. 19 is a front view of the transfer machine.
Figure 20:
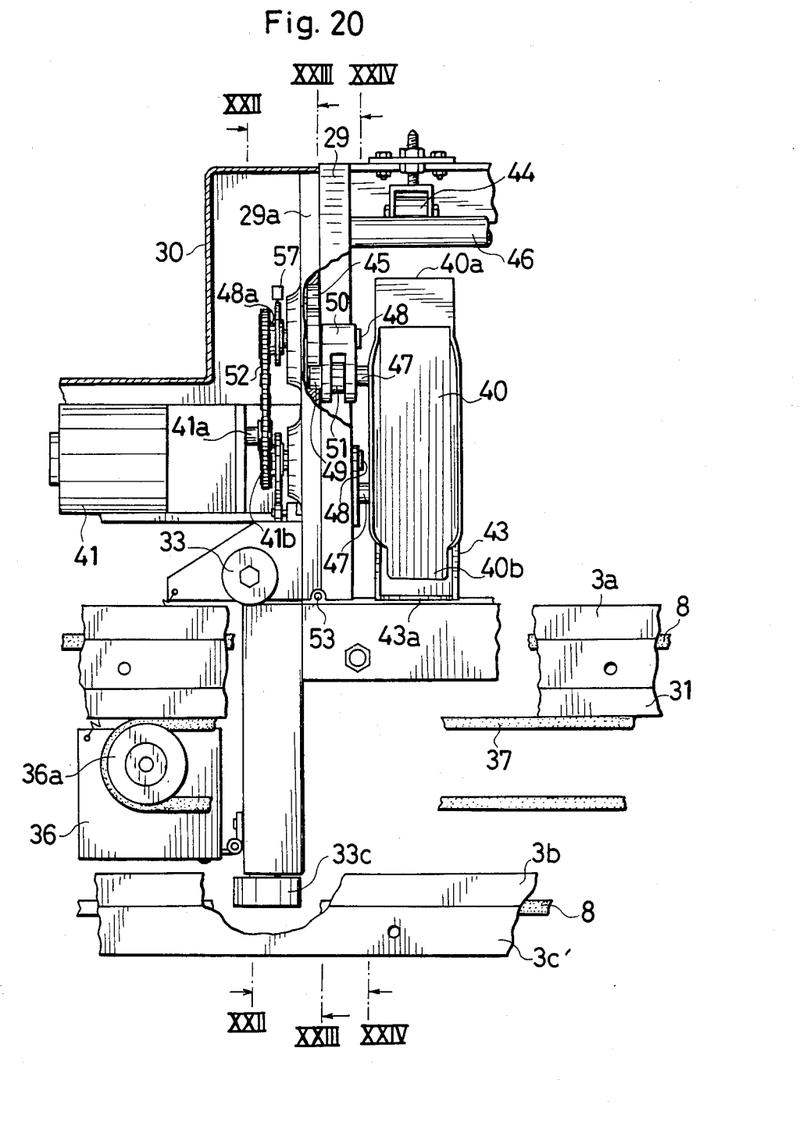
FIG. 20 is an enlarged view of left side of FIG. 19.

The transfer machine 4 will now be described in detail:

FIG. 18 shows a side view of the transfer machine 4 opposed to a cop magazine 2, and FIG. 19 shows a front view thereof except the cop magazine 2. The transfer machine 4 includes a pair of frames 29,29, double package extractors located therebetween, a pair of motors 41,41 for actuating the extractors. Each frame 29,29 has front and rear legs, and rollers 32, 32a, 33, 33a mounted on the legs, so as to hold the upper line 3a by the rollers. Each rear leg is provided with an extension bracket and another roller 33b is provided at the bottom of the extension bracket so as to keep the transfer machine 4 running along the lower line. The transfer machine also includes a gear 34 of a frictional type, having a driving belt 37, which maintains contact with a guide rail 3j hung under the upper line 3a, so as to drive the transfer machine 4 in opposite directions along the upper line 3a by driving the belt 37. In this embodiment the guide rail 3j is formed in one piece with the upper line 3a, but it is possible to make it as a separate body from the upper line 3a and connect it thereto. As seen in FIGS. 19 and 20, the driving belt 37 wound between two pulleys 36a, 35a, each of which is supported by a bracket 36, 35 hinged on the extension bracket, and driven by a motor 36b (FIG. 21) through the driving pulley 36a. These brackets 36, 35 are biased by a coil spring toward guide rail 3j to press the driving belt under the guide rail 3j. A bus duct 3c is provided under the lower line 3b, and a trolley arm extending from a controller box 31 disposed under the transfer machine 4 is led into the bus duct 3c. The motor 36b is controlled by a detector and a controller, which will be described below.

Figure 21:
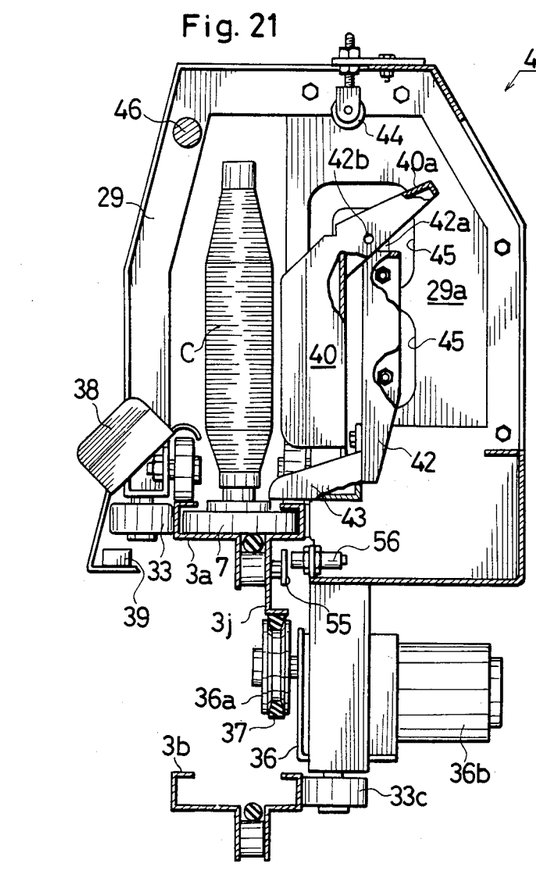
FIG. 21 is a left side view of FIG. 20.

The frames 29, 29 provide a tunnel having a pair of guide plates 38, 38, fixed to the frames 29 therein. Each guide plate 38 is bent in its upper portion and expanded sideways. Its lower part is folded, in which a package detector 39 is provided on each folded lower part. The detectors 39 of a photoelectric type can be used. Each detector 39 is arranged so as to detect the presence of a package in the open position 2b' (FIG. 3) of the magazine creel 2a through slots 39a formed at the front inclined surface of the guide plate 38. The transfer machine is arranged so as to supply two packages at the same time, when both open positions 2b, 2b' are not loaded, and one package if one of the open positions (usually, the left one 2b') is occupied. The transfer of the package starts by the actuation of the detectors. The interval between two guide plates 38 is equal to that between the open positions 2b, 2b', and the diameter of each tray base plate 7a is equal to the spacing. As the extractors are of a double type having a symmetrical structure, the description will be given with respect to the left-hand side. As seen in FIGS. 20 and 21, the transfer machine includes a traveling frame 42 which travels in four directions, that is, forward, upward, backward, and downward, an arm 43 for picking up the packages projected to the front side from the lower part of the traveling frame 42, and a swing plate 40 pivoted to the top of the traveling frame 42. The traveling frame 42 is made of a channel open at the rear side, and one of the side flanges opposite the frame 29 is fixed with supporting pins 47, 47, at its upper and lower parts. The arm 43 provides a pair of side walls having inclined top planes, and a bottom plate having a slit 43a having a sufficient width to allow the shoulder 7c to pass but not to allow the bottom of the bobbin to pass through. The swing plate 40 is U-shaped so as to hold a package therebetween. The top part of the swing plate 40, formed like a channel, slopes rearwardly and covers the traveling frame 42. In this manner the inclined top plane 40a is formed. A shaft 42b is passed through the channel of the swing plate 40 to support it on the bracket 42a of the traveling frame 42. A tongue 40b is extended in the arm 43 for pulling up the package from the lower edge of the swing plate 40. A roller 44, supported by the frame 29, is opposite the inclined plane 40a. The height of the roller 44 is adjustable.

The supporting pins 47, 47 supporting the traveling frame 42 circulate along upper and lower quadrilateral cam grooves 45 formed in the thick wall plate 29a of the frame, during which the frame 42 is maintained in a vertical posture.

Figure 22:
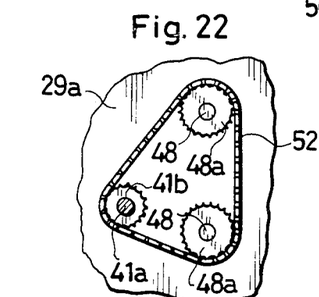
FIGS. 22, 23, and 24 are fragmentary cross-sections taken along lines XXII—XXII, XXIII—XXIII, and XXIV—XXIV in FIG. 20 respectively.
Figure 23:
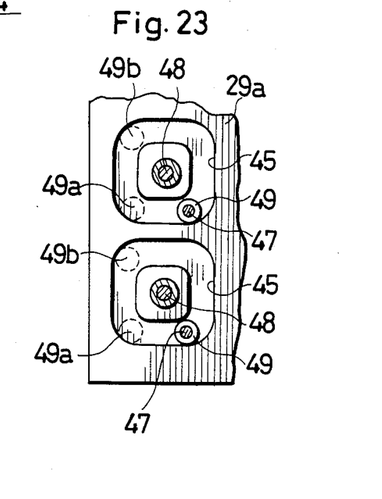
Figure 24:
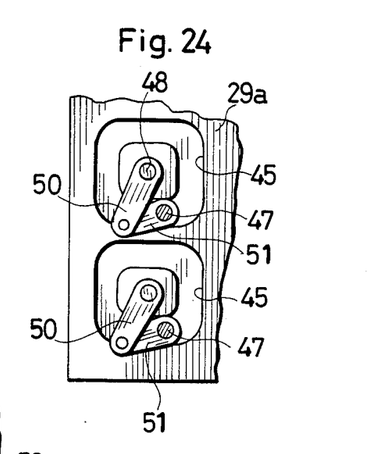

The circulator system of the traveling frame will now be described hereinbelow:

The wall plate 29a is provided with a motor 41, which has a sprocket 41b fixed to the output shaft 41a thereof. FIGS. 22 to 24 show fragmentary sections along lines XXII—XXII, XXIII—XXIII and XXIV—XXIV in FIG. 20, viewed from the direction of the arrows. A train of chain 52 is wound around the sprocket 41b and another sprocket 48a having the same number of teeth, being fixed on respective shaft 48 which is passed through the wall plate at the center of each cam groove 45 at one end. At the central ends of the shaft 48 crank arms 50 are fixed, and swing arm 51 is pivoted to the free end of the swing arm 51 at one end thereof, and hold the supporting pins 47, 47 rotatably at the other end. The supporting pins 47 are projected into the cam grooves 45 and cam rollers 49 are supported rotatably on the projected part thereof. In this manner the shaft 48 and the crank arm 50 are synchronously moved by the motor 41 to pull swing arms 51, and the supporting pins 47 are circulated along the locus of cam grooves 45, 45, as the motion of the one end of swing arms 51, 51 are controlled by cam grooves 45 and cam rollers 49. When the cam rollers 49 are located at the position shown by the full line in FIG. 23, the traveling frame 42 is at its retreated lower position shown in FIG. 21. The position shown by the dotted lines 49a is an advanced holding position, and the position shown by the dotted lines 49b is an ascending position. Upon occurrence of a single rotation of each shaft 48, each shaft 47 is rotated along the cam groove 45, during which the shaft maintains the traveling frame 42 substantially vertical while it is in rotation.

Figure 25:
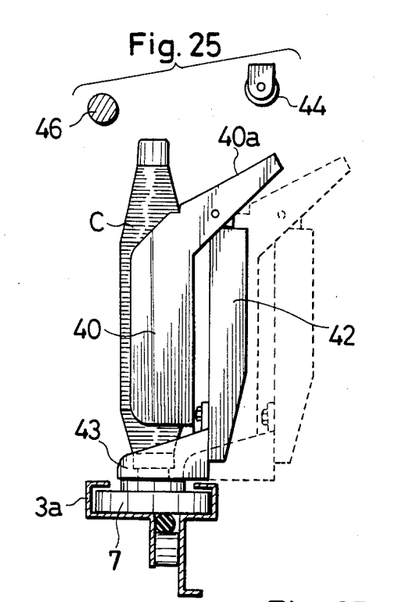
FIGS. 25, 26, and 27 are views showing the operation of the part shown in FIG. 21.
Figure 26:
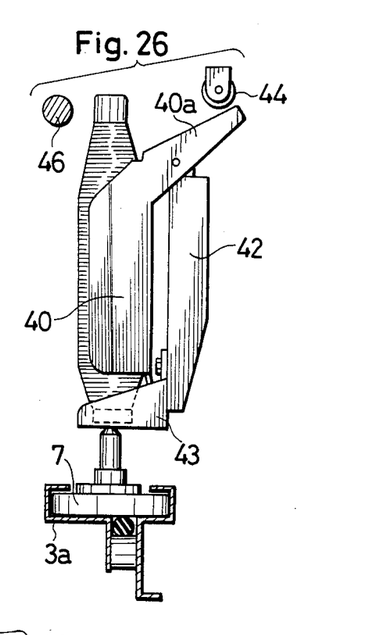
Figure 27:
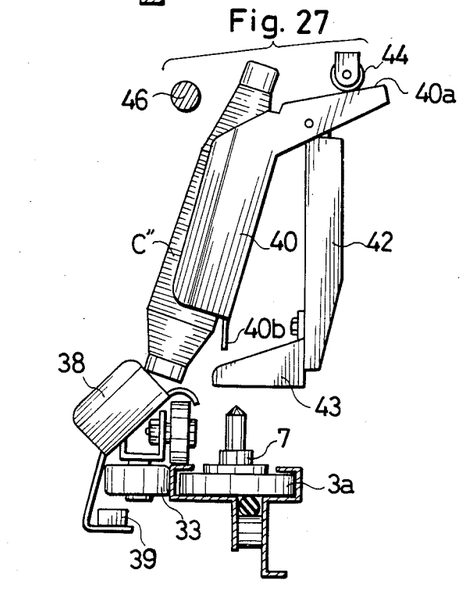

The arm 43 for picking up a package, as seen in FIG. 21, is located to keep its bottom as high as the shoulder 7c of the tray 7, and the swing plate 40 and the traveling frame 42 are so actuated as seen in FIGS. 25, 26, and 27 to thereby pick the package C from the tray 7, and to tilt it for transfer through the guide plate 38. The frame 29 is located at a position where the package is supplied, wherein the swing plate 42 is at its retracted position as shown by FIG. 21, and the trays 7 are stopped in front of the arms 43. Then the motor 41 is started to move the traveling frame 42. First the traveling frame 42 moves forward from the position shown by dotted lines to the position shown by the full line in FIG. 25, so as to enable the slit of the arm 43 to receive the shoulder 7c of the tray 7, and the swing plate 40 moves also that the package is held via the side walls thereof. Then the traveling frame rises up and the package is picked up from the tray 7 by the arm 43, as seen in FIG. 26. The picked package is held on the bottom of the arm 43 and swing plate 40. Immediately before the traveling frame 42 rises up to the highest position, the inclined top plane 40a is engaged with the roller 44, and starts to tilt as seen in FIG. 27. In this way the package C''' is shifted to the bottom of the arm 43 for moving it down through the guide plate 38 into a cop magazine 2 as seen in FIG. 18. The top of the package is prevented from tilting forward by a cross beam 46 fixed to the frame 29 at its front upper part.

When the traveling frame 42 is retracted, the inclined top plane 40a of the swing plate 40 is disengaged with the roller 44, and the swing plate 40 is restored to the original state, during which the traveling frame 42 descends to the position indicated by the dotted lines in FIG. 25.

In the foregoing description, the frame 29 is stopped at the position where the package is supplied, and the package is picked up from the tray reaching the position. However it is possible to arrange the transfer machine so as to keep a package at the position as shown by the full lines in FIG. 25 before it reaches the position where the package is supplied, and cause the frame 29 to be located where the package awaits. In this case the trays 7 are slid over the driving belt 8. When the trays are transported over a long distance along the conveyor line 3, a retaining means 53 for retaining the trays is disposed at the feed side of the conveyor line 3. The retaining means 53 is preferably actuated when a package, in the transfer machine or held in the arm 43, is detected so as to introduce a required number of loaded trays into the upper line 3a. The frame 29 is provided with a tray retainer at the entrance of the tunnel, through which trays are passed, so as to stock five or six loaded trays, and a release mechanism for releasing the tray.

Figure 28:
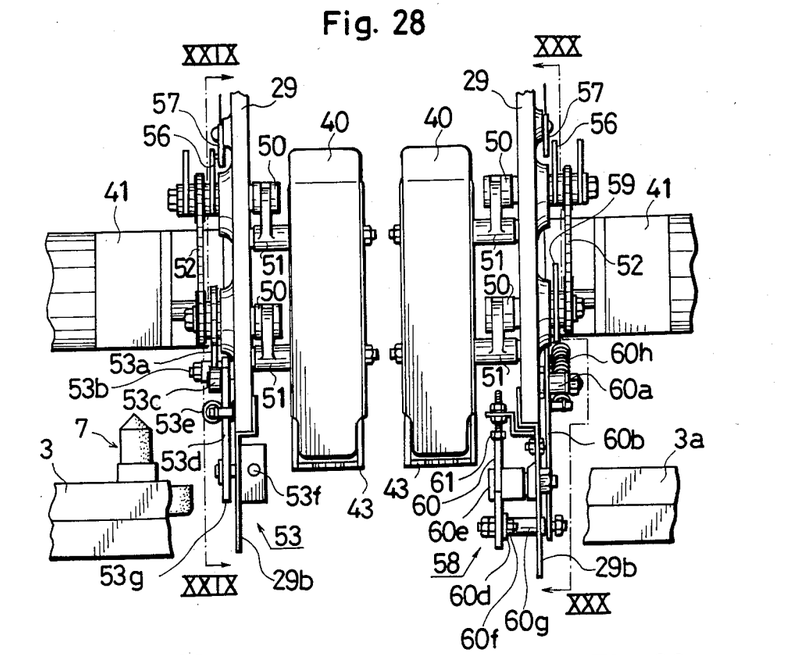
FIGS. 28 is a front view, partly omitted, showing the transfer machine, particularly the holding means and stopping means for the tray.
Figure 29:
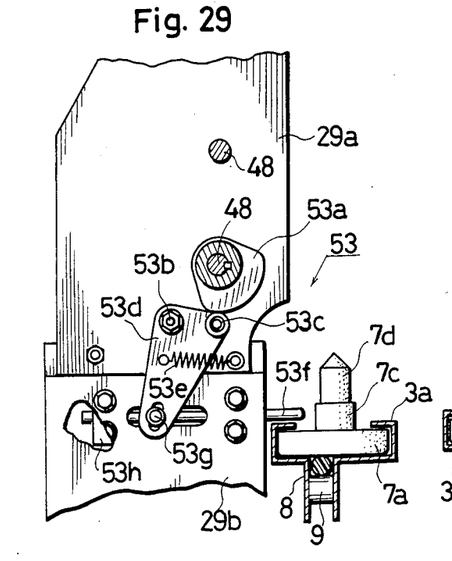
FIGS. 29 and 30 are vertical cross-sections taken along the lines XXIX—XXIX and XXX—XXX in FIG. 28, respectively.
Figure 30:
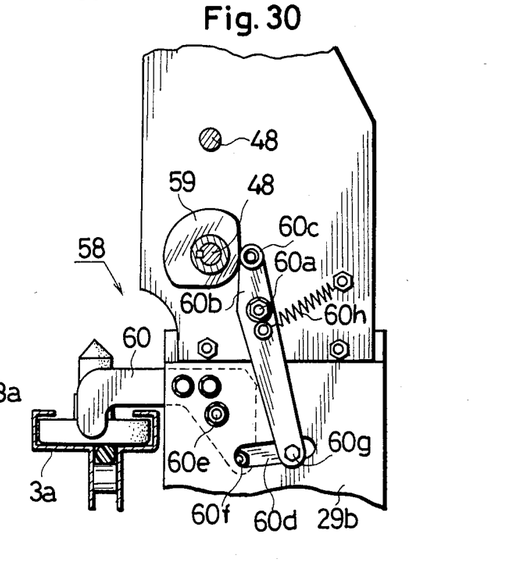

Preferably the retaining means comprises a pin indicated by the reference numeral 53 in FIG. 20 and the stopper comprises a rod which descends below the upper rail 3a. FIG. 28 shows the front of the transfer machine 4 similar to FIG. 20, particularly showing the retaining means 53 and the stopper unit 58. FIGS. 29 and 30 are vertical cross-sections taken along the lines XXIX—XXIX and XXX—XXX in FIG. 29, respectively, the former showing the retaining means 53 and the latter showing the stopper unit 30. The retaining means 53 has a cam 53a located on the lower side of the shaft 48, and a pivot 53b in the frame 29 so as to support the lever 53d, which has a ball 53c at its one end in such a manner as to mate with the cam 53a. There is provided a pivot 53g which is engaged with the lower end of the lever 53d through a slit. The lever 53d is biased so as to come into contact with the coil spring 53e. The pivot 53g engaging the lever 53d has a pin 53f passing therethrough at the opposite end, which pin 53f is freely supported by a pair of brackets 53h (one of which is not shown in the drawings). FIG. 29 shows the state in which the pin 53f has been withdrawn in accordance with the rotation of the cam 53a, thereby enabling the tray 7 to pass smoothly without any obstruction. When the pivot 48 is rotated about 180° in the clockwise direction, the lever 53d is rotated by the spring 53c in the counter-clockwise direction, thereby causing the pivot 53g to move to the right in FIG. 29, and also causing the pin 53f to protrude until it comes to engage the shoulder 7c of the tray. In this manner the tray 7 is retained with packages. The retention and release steps are performed at one revolution of the pivot 48, during which the traveling frame 42 is caused to protrude so as to prevent the frame 7 having packages from coming inside when it is in the waiting position (FIG. 25) and in the withdrawing position (FIG. 26).

The stopper unit 58 is intended to stop the package-loaded tray 7 in a corresponding position to the arm 43. The stopper rod 60 shown in FIG. 30 is rotated in the counter-clockwise direction by means of the pivot 60e, thereby stopping the tray 7. The stopper rod 60 is pivotally connected to the side plate 29b by means of a pivot 60e, and has another pivot 60f at its one end, which pivot 60f is provided at one end of a link lever 60d. The link lever 60d has a pivot 60g, which is protruded through a slit produced in the side plate 29a and is pivotally connected to a lower end of the lever 60b. The lever 60b is pivotally connected to the pivot 60a, and has a ball 60c in its upper section, wherein the ball 60c is located opposite a cam 59 fixed to the pivot 48. The ball 60c is biased so as to come into contact with the cam 59 by a spring 60h. In this manner the stopper rod 60 is caused to descend and tilt toward the upper rail 3a as shown in the drawing and ascend and withdraw therefrom during one revolution of the pivot 48. When the ascent and withdrawal of the stopper rod is effected, the tray is started to move free from packages.

There is provided a member 61 (FIG. 28) for restraining the descent and tilting of the stopper rot 60. The member 61 comprises an L-shaped bracket and an adjusting screw so as to restrain the top face of the rear portion of the stopper rod 60 (the right-hand side in FIG. 30).

Figure 31:
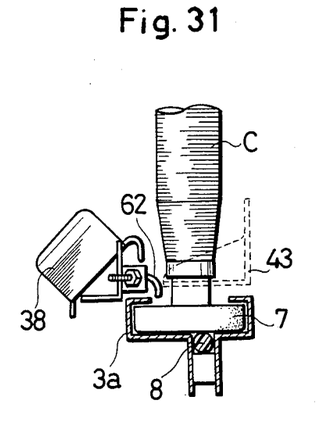
FIG. 31 is a side view showing the detector unit.
Figure 32:
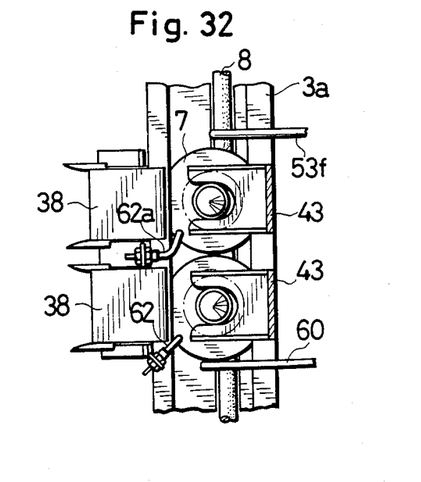
FIG. 32 is a plan view showing the detector unit.

As shown in FIGS. 31 and 32 there are provided detector units 62, 62a for detecting the presence of the tray in travel; more specifically the detector units are provided on the guide plate 39 of the transfer machine 4. For the detector units an optical reflector utilizing a fiberscope can be used. As shown in FIG. 32 the retained package-loaded tray 7 is lit, thereby detecting the presence thereof. To this end it is preferred to galvanize a base portion of the tray 7 with aluminum or any other reflective substance.

Now, the operation of these stopper and retaining means will be described. In the step shown in FIG. 21, the stopper rod is swung down to retain a loaded tray on the upper line 3a, and the pin 53f is withdrawn. Therefore, the loaded trays carried by the driving belt 8 are retained by the stopper rod 60. Then the motor 41 is started after the retention is confirmed by a sensor 62, 62a. The motor is stopped when the arm 43 arrives at the position shown by the full lines in FIG. 25. The motion of the transfer machine 4 is controlled by regulating the motor 36b, to find a place where the supply of a package is required. In order to find the place the upper line 3a is provided with marking boards 55, and the transfer machine 4 is provided with a sensor 56 corresponding to the marking board 55. When the sensor 56 encounters one of the marking boards 55 during traveling, the sensor detects the presence of a package in the cop magazine. If two packages are required, both motors 41 are actuated to pick up the packages, and stopped when the package assumes the position.

Figure 33:
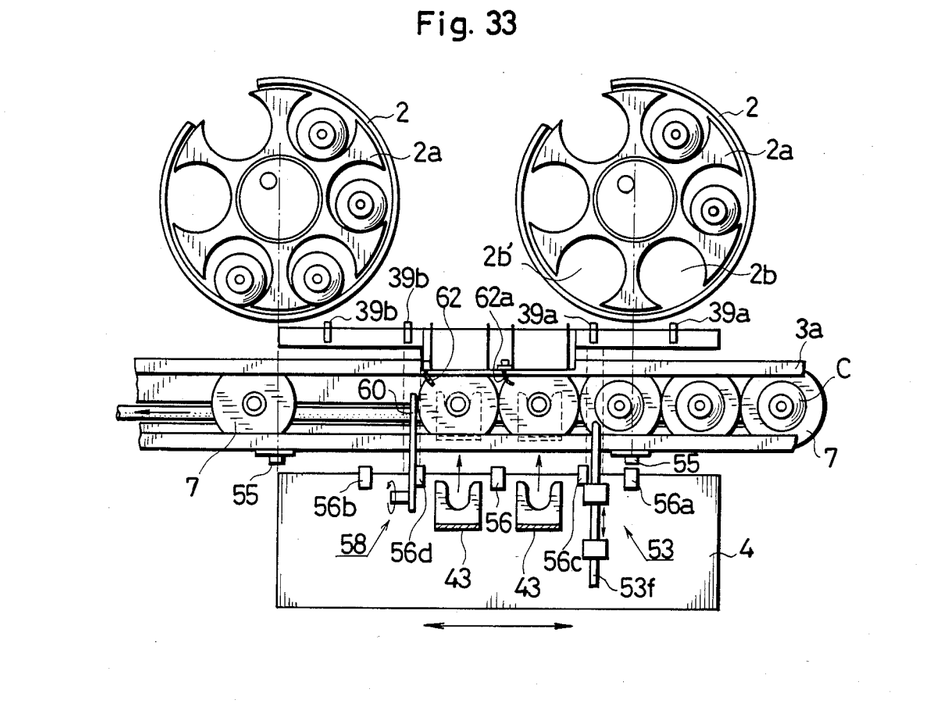
FIG. 33 is a schematic view exemplifying the operation of the transfer machine and the positional relationship between the transfer machine and the conveyor.

The pin 53f is then projected so as to retain the subsequent package-loaded tray. As shown in FIG. 33 shows the transfer machine runs to the right, and comes to a position at which a detector 56a on the transfer machine 4 faces a detecting plate 55 provided on the rail 3a, thereby enabling a pair of package detector units 39a to detect the packages at the package supply sections in the magazine 2. In response to the detection of the packages the transfer machine 4 is caused to move to a position at which the position detector unit 56 located at the center thereof faces the detecting member 55 provided on the rail, thereby loading two packages into positions 2b and 2b'. When the lack of a package in either of the positions 2b or 2b' is detected, the transfer machine 4 is stopped at the selected position, and a package is supplied to the package supply section of the machine from the retained tray. As shown in FIG. 33 the position detector unit on the transfer machine 4 comprises arms 43 and detector member 56a, 56b, 56c and 56d. The detector member 56b serves to effect the supply of two packages and the detector member 56d serves to stop the machine for loading one package only into the position 2b. The detector member 56b is provided so as to correspond to the package detector members 39b used when the transfer machine is moved to the left, and the detector member 56c serves to effect the supply of one package on the right-hand side. Reference numeral 56 denotes a detector located at the center between the two arms 43, which is used to stop the transfer machine whether it moves to the right or to the left.

For example, in FIG. 33 if the transfer machine 4 moves to the right and detects the absence of a package in the position 2b', the detector 55 comes into engagement with the detecting member 55, the transfer machine 4 is stopped, and a package is loaded into the vacant position 2b'. In the absence of a package in the position 2b, the detector member 56d comes into engagement with the position detecting plate 55, thereby stopping the transfer machine 4. At this stage one of the packages retained on the tray which is located at the left side is supplied. The package at the right side is retained by the arm 43 together with the tray 7. The stopper rod 60 is moved to release the tray from a vacant package, and synchronously with it the arm 43 is withdrawn toward the pin 53f from the position at which it retains the tray. The tray is then retained by the stopper rod 60, thereby introducing the subsequent package toward the pin 53f. To achieve this series of operations the motor 41 is provided with a reversing device, thereby enabling the arms to move forward and backward.

In FIG. 33 the positions of arms 43 are shown by solid lines and phantom lines, wherein the phantom lines indicate that the arms 43 are advanced whereas the solid lines indicate that the arms 43 are retracted when the arms are at the advanced position the stopper rod 60 moves inside the rail 3a at which position it retains the tray 7 whereas the pin 53f is withdrawn so as to retain several package-loaded trays toward the supply side of the transfer machine 4. When the transfer machine 4 supplies packages while moving to the left, the left-hand package detector members 39b detect the presence of packages in the supply section when the detector member 56b comes into engagement with the position detecting plate 55. Thus the package is supplied in the above-mentioned manner.

Figure 34:
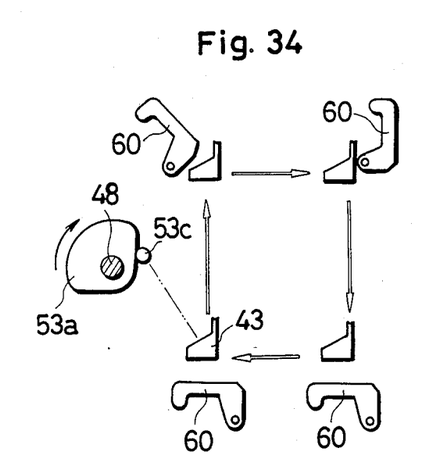
FIG. 34 is a schematic view exemplifying the operation of the stopper bar.

FIG. 34 shows the operational interrelationship between the arms 43, the stopper rod 60 and the cam 53a. While the arm 43 descends the package-loaded tray is introduced, and the stopper rod 60 returns to retain the tray. The cam 53a rotates in the direction of the arrow, and when it comes into engagement with the ball 53c at the position shown in FIG. 34, the arm 43 is ready to advance, and comes into engagement with the package-loaded tray 7 as shown in FIG. 25. The ascending arms 43 release the vacant tray from retention so as to discharge it out of the transfer machine 4.

Figure 35:
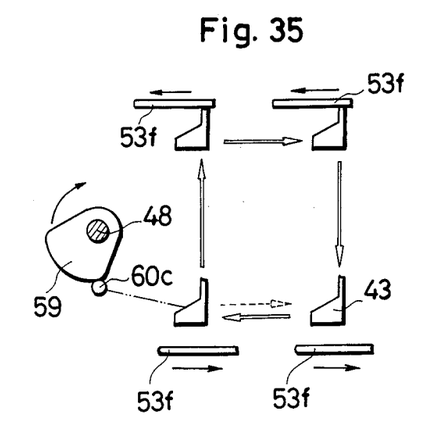
FIG. 35 is a schematic view exemplifying the holding means for the tray.

As shown in FIG. 35, while the arm 43 is at its lower position with the pin 53f being withdrawn, the package-loaded tray is introduced into the transfer machine 4 in which it is retained by the stopper rod 60. The pin 53f is returned as shown by phantom lines when one package near the stopper rod has been supplied.

In the illustrated embodiment the transfer machine 4 is constructed so as to move to the right and left during which the presence of packages is detected for two positions, thereby loading two or one package into the cop magazine 2. However, the transfer machine can be constructed to run only in one direction, or it is possible to use a single arm whereby the packages are loaded one by one. The speed of the transfer machine 4 is slower than that of the driving belt 8. In the illustrated embodiment the transfer machine 4 is caused to move by means of a belt conveyor, but any other driving means can be employed, for example, frictional rollers or a rack and pinion drive. To load packages into the cop magazine from the package-loaded tray it is also possible to use a rotary frame having a tiltable plate wherein the rotary frame is moved along a rectangular trace during which the packages are pulled out, and while it is ascending, the packages are loaded into the cop magazine from the tilted plate.

As evident from the foregoing description, the present invention has many advantages; one being that the yarn is free from, dirt, and another being that the conveyor line can be adapted for any site because of its flexibility.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for delivering cops wound by ring spinning frames to cop magazines in an automatic winder, wherein a leading yarn end is caught and put in an opening of a bobbin in transportation, comprising:
   a disposal machine for processing said leading yarn end and for disposing the leading yarn end of each cop in the opening of its respective bobbin;
   a conveyor having a plurality of guide rails for circulating a plurality of trays for transporting said cops, the conveyor line being connected to said disposal machine and including an upper line for feeding said cops and lower line for returning vacant trays;
   a transfer machine provided on said upper line; and
   means for moving said transfer machine in opposite directions for stopping in front of one of said cop magazines to which the supply of a cop is required, for picking up said cop from said tray and for transferring said cop to said cop magazine.

2. A system as defined in claim 1, further comprising chute means, wherein said conveyor line comprises a pair of guide rails and a driving belt having a round cross-section; a terminating end portion of said upper line being connected to a beginning end of the upper line through said chute means; a terminating end portion of said lower line being connected to said disposal machine through an ascending line in parallel with the upper line; and wherein said conveyor line further comprises a curved section for collecting vacant trays.

3. A system as defined in claim 1, further comprising a guide cylinder wherein said disposal machine comprises means for applying suction and holding the leading yarn end of said cop via suction provided by a jet nozzle disposed against the periphery of said cop while it is turned about its axis, and for transferring said cop into said guide cylinder including two split parts each having semi-circular cross-sections, the guide cylinder holding said cop momentarily when the split guide cylinder is closed and placing the leading yarn end in the top opening of the bobbin under pressure.

4. A system as defined in claim 1, wherein said transfer machine comprises a running gear for moving the transfer machine along said conveyor line in both directions; a traveling frame movable in forward, upward, backward, and downward directions, and having a fork lever insertable under an end portion of said bobbin, and a swing plate pivotably supported by a top section thereof; and means for tilting said swing plate so that the cop is transferred therefrom in operation.

* * * * *